July 30, 1935.   W. D. FOSTER ET AL   2,009,443
FILM HANDLING APPARATUS
Original Filed April 28, 1926   3 Sheets-Sheet 1
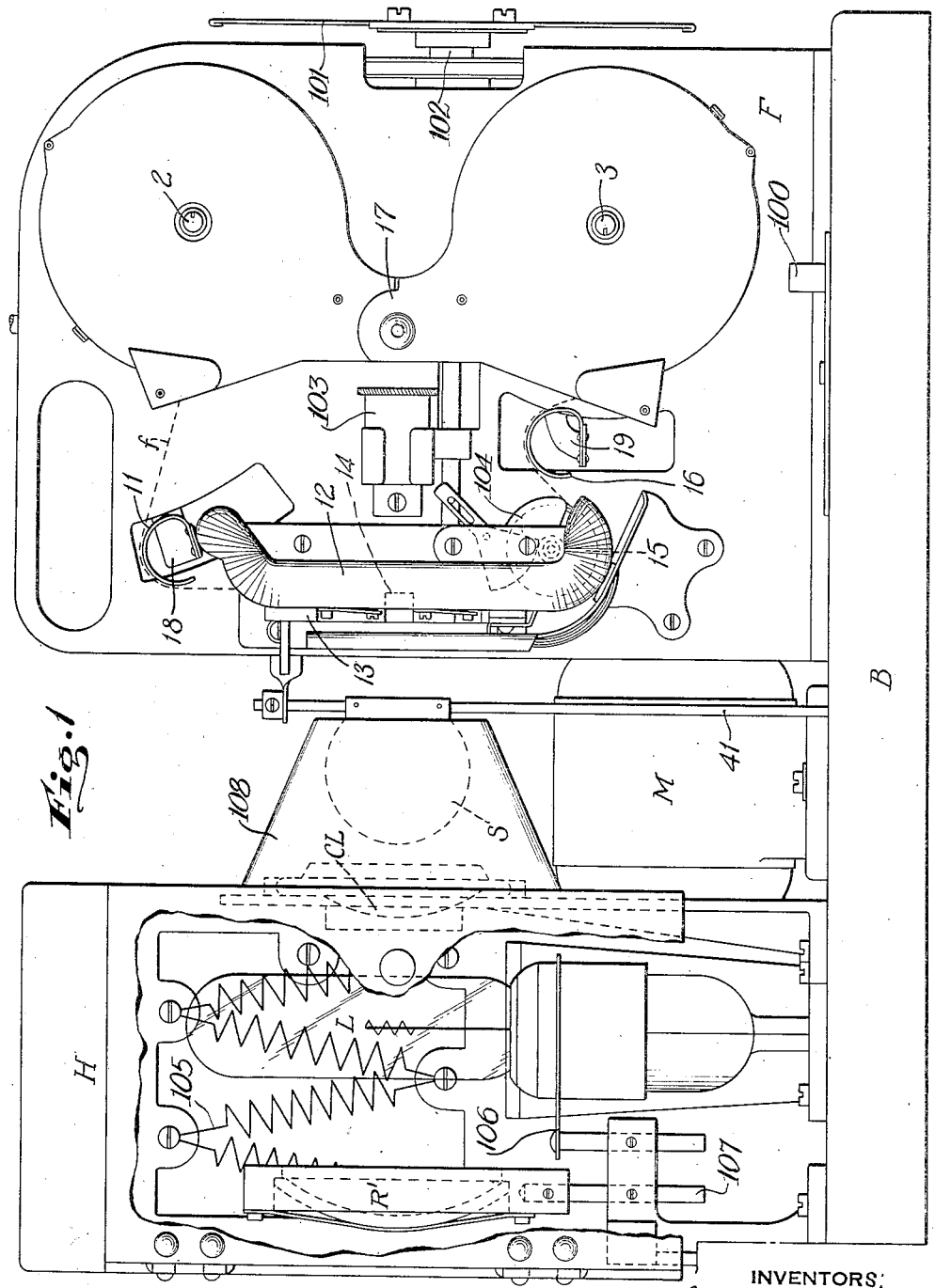
INVENTORS;
Warren Dunham Foster and
Earle L. Parmelee, dec'd.,
By Peoples-Pittsburgh Trust Company Executor,
By Warren D. Foster, ATTORNEY July 30, 1935.  W. D. FOSTER ET AL  2,009,443
FILM HANDLING APPARATUS
Original Filed April 28, 1926  3 Sheets-Sheet 2
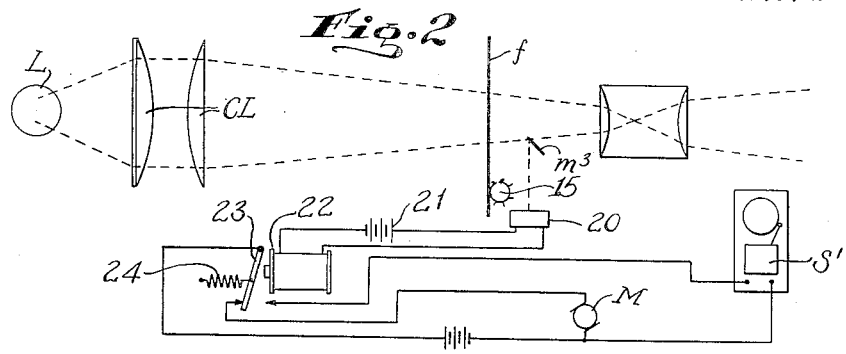
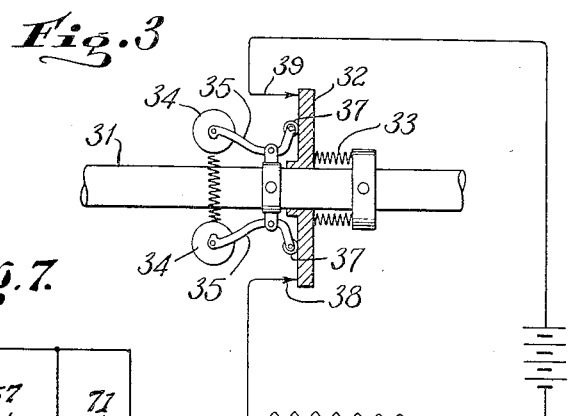
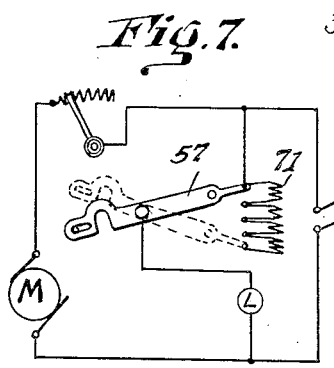
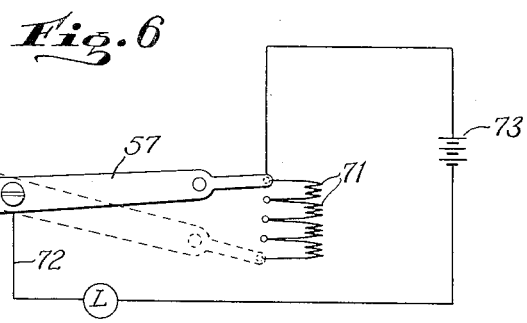
INVENTORS Patented July 30, 1935

2,009,443

UNITED STATES PATENT OFFICE 2,009,443

FILM HANDLING APPARATUS

Warren Dunham Foster, Washington Township, Bergen County, N. J., and Earle L. Parmelee, deceased, late of Pittsburgh, Pa., by Peoples-Pittsburgh Trust Company, executor, Pittsburgh, Pa.; said Peoples-Pittsburgh Trust Company assignor to said Foster Original application April 28, 1926, Serial No. 105,159. Divided and this application January 12, 1934, Serial No. 706,438

21 Claims. (Cl. 88—17)

The present invention relates generally to film handling apparatus and more particularly to power driven motion picture apparatus.

This application is a division from the co-pending application Serial Number 105,159, filed April 28, 1926 now Patent Number 1,944,024.

It is very desirable during the operation of power driven motion picture apparatus immediately to extinguish the light and stop the motor should the film break. Such actions regarding the light and the motor are important safeguards against igniting the film by the heat of the light, and further damage to the film by its movement by the motor after the breakage occurs. For example, should the rupture occur on the take-up side of the film, the film in the gate would be left there under the severe heat of the usual light source and a fire almost certainly result.

It has been proposed in connection with the operation of motion picture apparatus to provide means having parts movable directly by the film for extinguishing the light and stopping the motor should the film be broken during the feeding movement of the film. The operation of such means usually imposes additional strains on the film and therefore often causes a material increase in the strains which actually break the film.

It is an object of the present invention to provide means in a motor driven film handling apparatus which is operative without imposing additional strains on the film immediately to stop the motor if the film breaks. It is another object of the invention to provide means in a motion picture projector which is operative without imposing additional strain on the film to extinguish the light and to stop the film moving means if the film breaks. An additional object of the present invention is to provide a system of control responsive to variations in the character or intensity of the light for effecting cessation of operation of the apparatus, in the event of film breakage.

Motion picture apparatus has been proposed which has means for rewinding the film in the same apparatus in which it has been exposed. In certain types of such apparatus the film may be moved continuously at a much higher rate of speed for rewinding purposes than when it is being fed intermittently. During such rewinding movement the film passes along a path which intersects the light path. It is another object of the present invention to provide means in a power driven motion picture projector for immediately extinguishing the light and stopping the motor should the film break during its rewinding movement.

In carrying out the present invention, we may provide light responsive means on the side of the film opposite an electric light and provide means adjacent the light path for deflecting a portion of the light passed through the film to the light responsive means. We also may provide electrically operated means under control of the light responsive means which are effective to stop the motor upon the actuation of the light responsive means by the increase in light which it will receive should the film break. Means for reducing the amount of current reaching the light to any desired extent are actuated concomitantly with the stopping of the motor.

In the drawings:

Figure 1 is a side elevation of a motion picture projector to which our invention is applied for illustrative purposes. In this view, certain parts of the lamp housing are shown broken away.

Figure 2 is a diagrammatic view illustrating how light from the lamp of the projector actuates a photo-electric cell and controls the stopping of the motor and extinguishment of the light.

Figure 3 is a schematic elevational view partly broken away illustrating a centrifugal switch device on the motor shaft.

Figure 6 is a diagrammatic view illustrating means for increasing the resistance in the circuit of the electric lamp.

Figure 7 is a wiring diagram.

Figure 4:
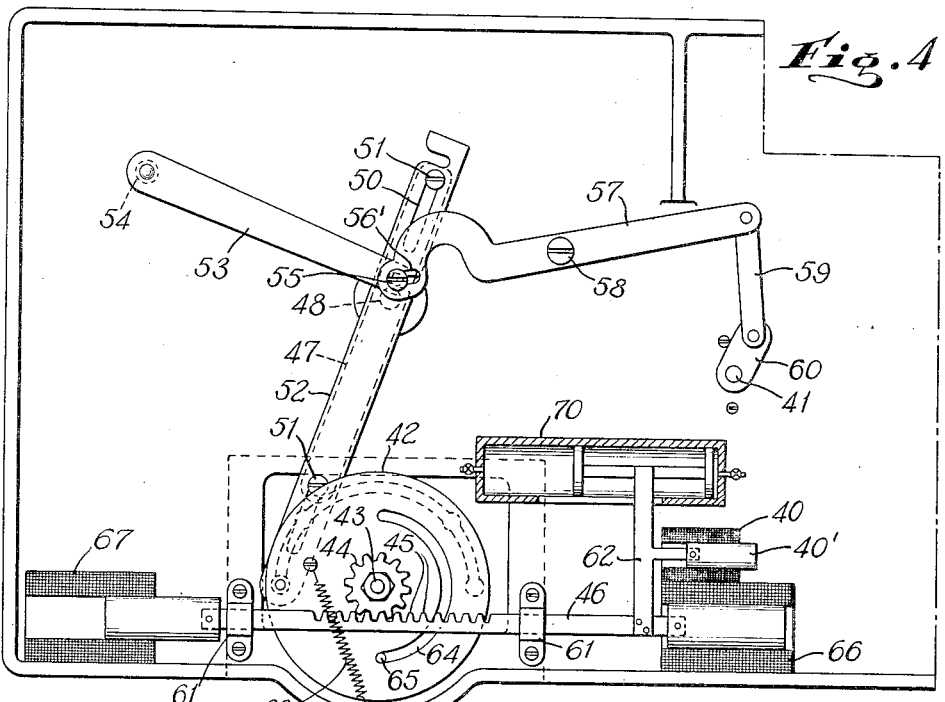
Figures 4 and 5 are diagrammatic views of control mechanism which is actuated upon the stopping the motor for controlling the light source.

The apparatus illustrated in the present invention is mounted in part on an upright mounting plate or frame F, supported on a base B. A delivery spindle 2 and a take-up spindle 3 are mounted in the frame F and may be operatively connected to an electric motor M by means such as are disclosed in our parent application. These connecting means need not be described in detail herein since their details are not necessary for an understanding of the present invention. The film f is drawn from a reel mounted on the delivery spindle 2 having a guide member 11, to be described further hereinafter, and thence through a gate structure which includes a fixed section 12 and a movable section 13, these sections defining a film path past an aperture 14. After passing through the gate, the film f is brought into engagement with an intermittent sprocket 15 which may be drivenly connected with the motor M by means such as are disclosed in our parent application.

From the sprocket 15 the film passes over a guiding member 16 constructed similarly to the guiding member 11 and thence to a take-up reel (not shown) mounted on the spindle 3. The delivery reel and take-up reel may be carried in a film holder 17 which may be constructed as disclosed in the United States Patent Number 1,440,173, granted to Ponting and Ford December 26, 1922, or other types of magazines or conventional open reels may be used. The guiding members 11 and 16 are carried by resiliently mounted arms 18 and 19 respectively, which may be constructed as disclosed in our parent application for operation according to the teaching of the co-pending application which has resulted in the United States Patent Number 1,944,022, granted to Bundick and Proctor on January 16, 1934. An electric lamp L of a well known kind may be mounted in the lamp house H and means including a reflector R' and a condensing lens CL operate to direct the strong beam of light on the film at the aperture 14 during normal projection of pictures from the film.

While the film $f$ is being moved by the above mentioned feeding means at normal speed there is no danger of the film being damaged or set on fire by the heat of the lamp house. However, should the film be stopped at the aperture for only a short period of time, there will be danger of the film, which is usually made of cellulose nitrate, catching fire. Should a slow burning or cellulose acetate film be employed, there probably will be no fire, but the film will disintegrate into a gummy mass which is difficult to remove from the gate.

To extinguish the light of the lamp L and also stop the motor upon the breakage of the film, we may employ means illustrated diagrammatically in Figure 2. In this view, one circuit is shown operable in the event of film breakage for automatically opening the motor circuit and also for producing an audible signal. In Figure 2 there is illustrated a mirror $m^3$ which, during normal film operation, is positioned relative to the lamp L and the film for normally receiving no direct light rays from the lamp. In the event of film breakage, it would directly receive light rays and deflect the same on a light sensitive element which may be constructed in well known ways to be activated only by reflected light of a certain brilliancy such as would reach the mirror $m^3$ upon breakage of the film. This element is connected in series through a source of current 21 with a relay 22, whereby in the event of concentration of light on the element 20 the relay will be energized and will attract its armature 23 against the action of the spring 24. This movement of the armature will be effective for opening the motor circuit, as can be seen by inspection of Figure 2, and at the same time will be effective for closing the circuit which includes a sound producing signal device illustrated as an electric bell S'. If desired, the mirror $m^3$ may be positioned in such manner that normally it receives a relatively small amount of light during operation while the film is intact or unbroken. In the event of film breakage and consequent removal of the film from across the aperture 14 by action of the film moving means of the invention then operative, there will be a marked increase in the amount of light concentrated onto the mirror which will in turn be effective for changing the resistance of the light sensitive element 20 for obtaining relay operations as before set forth.

As is well known to those skilled in the art, a motion picture film which breaks during a feeding operation in apparatus of the kind disclosed in the present application which uses no loop of unsupported slack and only one toothed feeding member disposed between the gate and the take-up reel is usually broken when a torn, patched, or otherwise weakened portion of the film is passing between the usual gate sections 12 and 13. These sections offer more resistance to the passage of such weakened portion through the apparatus than any other film engaging parts.

While the film is being rewound the gate is maintained fully open by the means described in our parent application, now Patent 1,944,024. During the rewinding of the film, should it break between the gate and the take-up reel, the rewinding reel will be operative to remove the film from across the light path at the aperture and permit the light to actuate the photo-electric cell and render effective the motor stopping means. Should the film break between the gate and the rewinding reel, the weight of the unwound film between the point of the break and the take-up reel will usually be effective to cause the film to fall clear of the gate.

It can be readily seen by those skilled in motion picture apparatus that, as shown for example in Figure 7, if desired the lamp L may be connected in a well known way in circuit with the motor M and when the relay 22 opens the circuit of the motor M and stops it, the relay will also extinguish the light of the lamp L.

In Figure 3, the shaft 31 of the motor M (not shown in this view) is arranged with means effective for performing operations, such as operatively moving certain parts of the apparatus in a way to be described hereinafter. This is accomplished by providing the driving shaft 31 with a centrifugally operated switch. This switch may comprise a disc 32 movable axially of the shaft of the motor M, and normally urged to the left, as viewed in Figure 3, by a compression spring 33. Movement of the disc 32 in the opposite direction is effected by centrifugally operated means of well known construction which may include two weights 34 carried on the ends of arms 35 pivotally mounted on a collar member 36. The arms 35 may be shaped as shown in Figure 3 and in the opposite end of each arm 35 from the weight 34 is mounted a roller 37 which bears against the disc 32. By reason of this construction, so long as rotation of the shaft 31 continues, the disc 32 will be moved to the right in opposition to the spring 33 and out of engagement with contacts 38 and 39. In the event that the shaft ceases rotation, the disc will move to the left and establish a circuit through the solenoid 40, as will be apparent from the drawings, thereby automatically effecting predetermined movements of parts of a control mechanism described hereinafter.

For protecting the film at the aperture when the film is not moving a shield S is mounted on a vertical shaft 41 which extends downwardly through the top of the base B. An operative connection between the solenoid 40 and the rock shaft 41 is provided and may include a disc 42 mounted on a pin 43 secured in the base B and extending downwardly therefrom. Fastened to the disc 42 to revolve therewith is a pinion 44 which engages with rack teeth 45 in a connecting member 46 to be further described hereinafter.

A lever device for cooperation with the disc 42 is provided and includes a lever 47 pivoted on the lower end of a rotatable rod 48 extending upwardly through the top of the base B. Slidably mounted on the lever 47 by means of slots 50 and screws 51 is a second lever member 52 which has its lower end (as viewed in Figure 4) pivotally fastened to the disc 42. It will be noted that the lever 52 is therefore capable of angular movement and lengthwise movement. To connect the lever 52 with the lower end of the rock shaft 41 an arm 53 may be pivotally mounted on a hollow shaft 54 which extends upwardly through the base as for such purposes as are disclosed in our parent application. On the outer end of the arm 53 is mounted a shoulder screw 55 which has an end portion arranged for engaging in a crosswise slot 56 provided in the lever 52. A connection between the shoulder screw 55 and the rock shaft 41 includes a lever 57 pivoted on a screw 58 in the base B. This lever 57 has an elongated slot 56' arranged for engaging the shoulder screw 55. To the opposite end of the lever 57 from the slot 56 is connected one end of a link 59 and the other end of this link is connected to an arm 60 fastened on the rock shaft 41.

Figure 5:
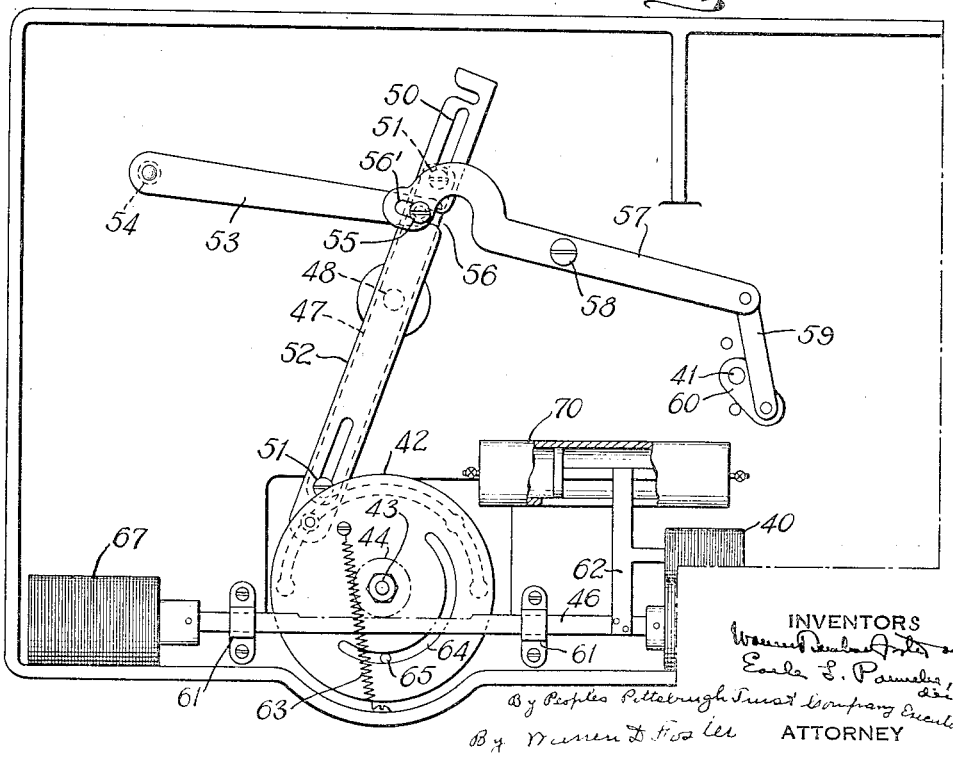

It can therefore be seen by inspection of Figures 4 and 5 that clockwise movement of the disc 42 as shown in Figure 4 will be effective for moving the lever 57 angularly in a clockwise direction and thus rotate the rock shaft 41 sufficiently for moving the shield S to operative position across the light path and thus protect the film from the light when the film ceases to move owing to stopping of the motor by the above described means when the film breaks.

For moving the disc 42 in a clockwise direction so as to operate the shield S upon the energization of the solenoid 40, the cross bar 46 is mounted for lengthwise movement in straps 61, and to one end of the cross bar is fastened a transverse member 62 which extends adjacent the solenoid 40. The core 40' of the solenoid 40 is connected to the transverse member 62. In normal operating position of the apparatus, the disc 42 is held in the Figure 5 position by a spring 63, arranged as shown in Figure 5, a slot 64 in the disc 42 and a pin 65 operating in the disc. The disc may be moved to the Figure 4 position either by using means disclosed in our parent application or by energizing a solenoid 66 the core of which is connected to the right end of the bar 46, as viewed in Figure 4. In the film feeding position of the apparatus, the disc 42 and the core of the solenoid 40 are so positioned (see Figure 4) that upon the energizing of the solenoid in the way described above when the motor stops the disc 42 is revolved a predetermined amount clockwise and the shutter is operated as described above. A solenoid 67 oppositely disposed to the solenoid 66 is arranged for moving the disc 42 and the apparatus connected therewith by means described in our parent application to a position for rewinding the film at a higher speed than the film feeding speed of the apparatus, and with the gate open. Should the film break during rewinding operations, the energization of the solenoid 40 would be effected by the means described above and the shield S would be moved to film protecting position if not already disposed therein by means such as are shown in our parent application.

For controlling the speed of the movement of the apparatus upon the energizing of the solenoids 40, 66 and 67, there may be provided a dash pot device generally designated as 70 which may be constructed as is set forth in our parent application.

Instead of operating the shield S upon the stopping of the motor M, additional resistance 71 may be cut into the circuit 72 of a source of electricity 73 connected with the lamp L. This result may be obtained as shown in Figure 6 by employing the lever 57 as a wiper arm to cut in the additional resistance 71 upon the energizing of the solenoid 40 when the film breaks. It will be understood by those skilled in electric circuits that the resistance 71 may be such as substantially to extinguish the lamp L if desired.

Certain parts shown in Figure 1, such as the knob 100, for normally operating the control mechanism, the shutter 101 on a shaft 102, an objective lens 103, a film stripper 104, a fixed lamp resistance 105, a lamp support 106, a lens support 107, and a lamp house cone 108, may be constructed as described in our parent case for cooperation with the other parts of the apparatus described hereinbefore.

It can be readily seen by those skilled in the art that the means disclosed hereinbefore for controlling the motor and the usual light source upon the breakage of the film may be actuated by light auxiliary to that used for projection purposes, as shown in one exemplification for purposes of illustration only, in Figure 2, positioned if desired, for coaction with a photo-electric cell placed at any convenient point on the opposite side of the film.

In several of the attached claims as a matter of brevity and convenience, the expression "photoelectric cell" has been used. This phrase is to be taken to include any type of light sensitive element, whether it modifies an electric current which is delivered to it or creates an electric current directly, or whether it is actuated by relative brightness or relative darkness.

Certain of the advantages of our invention will appear from the foregoing part of the specification. Other advantages arise from the provision of an inexpensive positive means for safeguarding the film against further damage by the lamp or the motor in case the film breaks.

Other advantages arise from the use of a control mechanism normally under control of the film as it is being operatively moved through the apparatus to operate safety devices even when the film is broken and can no longer be operatively moved.

We claim:

1. In a film handling apparatus, a source of light, an aperture, means for feeding a film past said aperture, a motor for driving said feeding means, means operable for stopping said motor, and light responsive means normally inoperable by light passed from said source through the film, said light responsive means becoming operative for actuating said stopping means upon the breaking of the film as it is fed through said apparatus and the removal thereafter of the film from across the path of said light by said feeding means.

2. In a film handling apparatus, a source of light, an aperture, means for feeding a film past said aperture, a motor for driving said feeding means, means operable for stopping said motor, light responsive means normally inoperable by light from said source through the film, and operable for actuating said stopping means upon the breaking of the film as it is fed through said aperture and its removal thereafter from across the path of said light by said feeding means, said means including a circuit having a photo-electric cell as an element thereof, and a relay in said circuit.

3. In a film handling apparatus, a source of light, mechanism for operatively moving the film through said apparatus, driving means for said mechanism, means for stopping said driving means, and light responsive means disposed on the opposite side of the film from said light for actuating said stopping means only upon receiving light directly from said source when the film is moved from between said light source and said light responsive means.

4. In a film handling apparatus, a source of light, mechanism for operatively moving an image-bearing film through said apparatus, the images on said film changing the strength of the light rays which pass through the film, a motor for driving said film moving mechanism, a circuit for said motor, means for opening said circuit, and light responsive means for actuating said circuit opening means, said light responsive means being positioned in said apparatus on the opposite side of the film from said light source for receiving an actuating amount of light from said source only upon the breakage of the film and its removal thereafter by said moving mechanism.

5. In a film handling apparatus, a delivery member, a taking up member, means for feeding a film from said delivery member to said taking up member, an aperture, a source of electric light for cooperation with said aperture including a circuit, a motor for driving said feeding means, an electric circuit for said motor, means for breaking said motor circuit for stopping said motor, and means responsive only to light passed directly thereto through said aperture upon the breakage of the film and its removal from the path of the light from said source for actuating said circuit breaking means thereby stopping said motor.

6. In a film handling apparatus, a first film supporting member, a second film supporting member, said supporting members being arranged to permit a film being moved between them, means for intermittently moving a film from said first member to said second member for projection purposes, means for moving the film from said second member to said first member for rewinding the film, a motor for driving both of said moving means, a source of light, and means responsive only to light from said source for stopping said motor upon the breakage of the film and its removal from the path of the light from said source, said light responsive means being inoperable by light from said source passed through the moving film irrespective of the direction of movement of the film.

7. In a film handling apparatus, a source of light, a first film supporting member, a second film supporting member, said supporting members being arranged to permit a film being moved between them, means for moving a film from said first member to said second member for projection purposes, means for moving the film from said second member to said first member for rewinding purposes, a motor for driving both of said moving means, and means controlled by the film for stopping said motor upon breakage of the film and its subsequent removal from the path of the light from said source, said means including a photo-electric cell positioned on the opposite side of the film from said light and arranged to be inoperable by light from said source passed through the moving film irrespective of the direction of movement of said film through said apparatus.

8. In a film handling apparatus, a source of light, an aperture, means for feeding a film past said aperture, a motor for driving said feeding means, means operable for stopping said motor, means operable for producing an audible signal, and means controlled by light from said source passing through said aperture, said last named means becoming operative only upon the breaking of the film as it is fed through said apparatus and its removal from the path of said light for actuating said stopping means and said signal sounding means.

9. In a film handling apparatus, a source of light, mechanism for operatively moving an image-bearing film through said apparatus, a motor for driving said film moving mechanism, electric means for producing an audible signal, a normally closed circuit for said motor, a normally open circuit for said signal producing means, circuit operating means for opening said motor circuit and concomitantly closing said signal circuit, and light responsive means for actuating said circuit operating means, said light responsive means being positioned in said apparatus on the opposite side of the film from said light source for receiving an activating amount of light from said source only upon the breakage of the film and its removal from the path of the light from said source.

10. In a motion picture apparatus having means for projecting a film which is injured by excessive heat, an electric lamp for passing light through said film, means for moving said film past said lamp, a circuit for said lamp, means for controlling said circuit, and means responsive to direct light from said lamp passed through said aperture following the removal of said film from the path of said light for actuating said circuit controlling means, said last named means being inoperable by light from said source passed through said film while the same is being moved past said source.

11. In a motion picture apparatus, an apertured member, means for feeding a film past the aperture of said member, an electric lamp for passing light through the film at said aperture, a circuit for said lamp, means for increasing the resistance in said circuit, and means responsive to direct light from said lamp passed through said aperture following the breakage of the film and its removal from the path of said light at said aperture for actuating said resistance increasing means, said actuating means being unaffected by light passed through the film while it is being fed past said aperture.

12. In a film handling apparatus, a source of light, mechanism for operatively moving the film through said apparatus and across the path of said light, a motor for driving said film moving mechanism, a circuit for said motor, means for opening said circuit, light responsive means for actuating said circuit opening means, said last named means including a photo-electric cell, said light source directing light through said film to said cell, an electric circuit having said cell as an element thereof, an electro magnet in said cell circuit, an armature member movable by said electromagnet, said armature member constituting an element of said motor circuit, said cell being actuated by said light only after said film breaks and is removed from across the path of said light.

13. In a film handling apparatus, a source of light, mechanism for operatively moving the film through said apparatus and across the path of said light, a motor for driving said film moving mechanism, an electric sound producing means, a circuit for said motor, a normally open circuit for said sound producing means, means for opening said motor circuit, means for closing said sound circuit, light responsive means for actuating both said circuit operating means simultaneously, said last named means including a photo-electric cell, means for passing light through said film to said cell said light passed through said film being ineffective to actuate said cell, an electric circuit having said cell as an element thereof, an electromagnet in said cell circuit, and an armature member movable by said electromagnet, said armature member constituting an element of both said motor circuit and said sound circuit, whereby upon movement of said armature member a warning sound is automatically produced and said motor is automatically stopped upon the breakage and removal of the film from said path, said cell being actuated by light reaching it from said source without passing through the film.

14. In a film handling apparatus having a source of electric light and means for moving said film past said light source, in combination, a motor for driving said film moving means, resistance connectible in the circuit of said light source, means for connecting said resistance in said circuit, means for actuating said connecting means upon the stopping of said motor, and means for stopping said motor, said stopping means including a light responsive device disposed on the opposite side of the film from said light source and actuable by light from said source during the operation of said apparatus by said motor only upon the breakage of said film and its consequent removal from between said light source and said light responsive device.

15. In a film handling apparatus having a source of electric light and means for moving an image-bearing film past said light source, in combination, a motor for driving said film moving means, resistance connectible in the circuit of said light source, means for connecting said resistance in said circuit positioned on the opposite side of the film from said light source, means for actuating said connecting means upon the stopping of the motor, light responsive means operated by the breakage of the film and its consequent removal from between said light source and said light responsive device for stopping said motor, and means for operating a signal upon the stopping of said motor.

16. In a motion picture apparatus, an aperture, means for feeding a film past said aperture, a source of light arranged for cooperation with said aperture for projecting pictures from the film disposed at said aperture, a motor for driving said feeding means, means operable for stopping said motor, means for actuating said motor stopping means upon the breaking of the film as it is fed past said aperture, said actuating means including a light responsive device positioned on the opposite side of the film from said light source, and constructed to become operative only upon the breaking of the film and its removal by said feeding means from between said light source and said light responsive device, and an operative connection between said motor and said light becoming effective upon the stopping of said motor for extinguishing said light.

17. In a film handling apparatus, a source of electric light, mechanism for operatively moving an image-bearing, light-diminishing film through said apparatus, across the path of light from said source, a motor for driving said mechanism, means for stopping said motor, means operable upon the stoppage of said motor for controlling the circuit of said light source, and light responsive means disposed on the opposite side of the film from said light source and effective for actuating said stopping means only upon receiving undiminished light from said source upon the breaking of the film and the removal of the same from the path of said light.

18. In a film handling apparatus, means for feeding a film past said aperture, a source of electric light for projecting pictures from said film at said aperture, a motor for driving said feeding means, a circuit for said motor, a relay in said circuit, a photo-electric cell connected in said circuit and disposed on one side of said film to be normally protected thereby from light which is only effective to activate said cell and close said circuit upon reaching said cell without having passed through said film, means operable upon the stoppage of said motor for substantially extinguishing said projecting source of light, said photo-electric cell being actuated upon the removal of said film from the path of said light source by said feeding means for actuating said relay and opening said motor circuit.

19. In a motion picture apparatus employing a fragile film which is injured by excessive heat, a delivery carrier, a take-up carrier, means for defining a path of travel for said film from said delivery carrier to said take-up carrier, means for feeding said film intermittently along said path of travel, a lamp arranged for passing light through said film at a point between said take-up carrier and the place along said film path where said film is normally subjected to the greatest strain tending to break the same, control means for said apparatus, and means for actuating said control means, said actuating means including a photo-electric cell positioned on the opposite side of said film path from said lamp, said cell being constructed to become operative by light from said lamp when said film breaks and is removed from between said light and said film, said cell remaining inoperative by light reaching it from said lamp which has passed through said film.

20. In a motion picture apparatus employing a fragile film which is injured by excessive heat, a delivery carrier, a take-up carrier, means for defining a path of travel for said film from said delivery carrier to said take-up carrier, means for moving said film along said path of travel alternatively in each direction, a lamp arranged for passing light through said film at a point between said take-up carrier and the place along said film path where said film is normally subjected to the greatest strain tending to break said film, control means for said apparatus, and means for actuating said control means, said actuating mens including a photo-electric cell positioned on the opposite side of said film path from said lamp, said cell being constructed to become operative by light from said lamp only when said film breaks and is removed from between said light and said film, said cell remaining inoperative by light reaching it from said lamp which has passed through said film.

21. In a film handling apparatus, a source of electric light, mechanism for operatively moving an image-bearing film through said apparatus, a motor for driving said mechanism, means operable for stopping said motor, means operable upon the stoppage of said motor for controlling the circuit of said light source for substantially extinguishing said light, and means for actuating said motor stopping means upon a predetermined increase in the light passed through the plane of said film from said source of light, said last named means including a light responsive device positioned upon the opposite side of the plane of said film from said source, said light responsive device remaining unaffected by light from said source until said film is broken during the operation of said moving mechanism and is removed from between said light source and said light responsive device.

WARREN DUNHAM FOSTER.
PEOPLES-PITTSBURGH TRUST COMPANY,
Executor of Will of Earle L. Parmelee, Deceased,
By GWILYM A. PRICE,
Vice President and Trust Officer.